United States Patent
Noriyama et al.

(10) Patent No.: US 10,882,140 B2
(45) Date of Patent: Jan. 5, 2021

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventors: Keiichi Noriyama, Shiga (JP); Hirohisa Kuramoto, Shiga (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 230 days.

(21) Appl. No.: 15/125,385

(22) PCT Filed: Mar. 25, 2016

(86) PCT No.: PCT/JP2016/059765
§ 371 (c)(1),
(2) Date: Sep. 12, 2016

(87) PCT Pub. No.: WO2017/163430
PCT Pub. Date: Sep. 28, 2017

(65) Prior Publication Data
US 2018/0133840 A1 May 17, 2018

(51) Int. Cl.
*B23K 26/342* (2014.01)
*B33Y 30/00* (2015.01)
(Continued)

(52) U.S. Cl.
CPC .......... *B23K 26/342* (2015.10); *B22F 3/1055* (2013.01); *B23K 26/032* (2013.01);
(Continued)

(58) Field of Classification Search
CPC .............. B22F 2999/00; B22F 2203/03; B22F 2203/11; B22F 2003/1056;
(Continued)

(56) References Cited

U.S. PATENT DOCUMENTS 9,327,450 B2   5/2016   Hein et al.
2008/0314878 A1   12/2008   Cai et al.
(Continued)

FOREIGN PATENT DOCUMENTS

JP   2010-509092 A   3/2010
JP   2015-188938 A   11/2015
(Continued)

OTHER PUBLICATIONS

Merriam-Webster definition of "derive".*
(Continued)

*Primary Examiner* — Erin E McGrath
(74) *Attorney, Agent, or Firm* — Ladas & Parry LLP (57) ABSTRACT

The temperature of a molten pool is measured based on an image captured by an infrared camera or the like. A three-dimensional laminating and shaping apparatus include a material ejector that ejects a material of a three-dimensional laminated and shaped object. The three-dimensional laminating and shaping apparatus includes a light beam irradiator that irradiates the ejected material with a light beam. The three-dimensional laminating and shaping apparatus includes an image capturer that captures a molten pool of the material formed by irradiating the ejected material with the light beam. The three-dimensional laminating and shaping apparatus includes a temperature deriving unit that derives a
(Continued)

temperature of the molten pool based on a luminance of an image of the molten pool captured by the image capturer.

8 Claims, 9 Drawing Sheets

(51) Int. Cl.

| | |
|---|---|
| B33Y 10/00 | (2015.01) |
| B23K 26/03 | (2006.01) |
| B33Y 50/02 | (2015.01) |
| B23K 26/082 | (2014.01) |
| B23K 26/14 | (2014.01) |
| B22F 3/105 | (2006.01) |
| B29C 64/153 | (2017.01) |
| B29C 64/393 | (2017.01) |
| G01J 5/00 | (2006.01) |
| B23K 26/144 | (2014.01) |

(52) U.S. Cl.
CPC .......... *B23K 26/034* (2013.01); *B23K 26/082* (2015.10); *B23K 26/14* (2013.01); *B23K 26/144* (2015.10); *B29C 64/153* (2017.08); *B29C 64/393* (2017.08); *B33Y 10/00* (2014.12); *B33Y 30/00* (2014.12); *B33Y 50/02* (2014.12); *G01J 5/0037* (2013.01); *B22F 2003/1056* (2013.01); *B22F 2003/1057* (2013.01); *B22F 2999/00* (2013.01); *G01J 2005/0077* (2013.01); *G01J 2005/0085* (2013.01); *G01K 2213/00* (2013.01); *Y02P 10/25* (2015.11)

(58) Field of Classification Search
CPC ............ B22F 2203/1057; B22F 3/1055; B22F 2003/1057; B23K 26/032; B23K 26/034; B23K 26/342; B23K 26/082; B23K 26/14; B23K 26/144; B33Y 10/00; B33Y 30/00; B33Y 50/02; B29C 64/153; B29C 64/393; G01J 5/0037; G01J 2005/0077; G01J 2005/0085; Y02P 10/295; G01K 2213/00
USPC .................. 219/76.1, 121.6, 121.85, 121.83, 219/121.65–66, 121.8, 76.12, 121.12
See application file for complete search history.

(56) References Cited

U.S. PATENT DOCUMENTS

| | | | |
|---|---|---|---|
| 2014/0163717 A1 | 6/2014 | Das et al. | |
| 2015/0268099 A1 | 9/2015 | Craig et al. | |
| 2017/0095885 A1* | 4/2017 | Zhang | ................ B29C 65/1648 |
| 2017/0151628 A1 | 6/2017 | Craig et al. | |

FOREIGN PATENT DOCUMENTS

| | | |
|---|---|---|
| JP | 2015-196265 A | 11/2015 |
| JP | 2016-502603 A | 1/2016 |
| WO | 2008/055615 A1 | 5/2008 |
| WO | 2015/151574 A1 | 10/2015 |

OTHER PUBLICATIONS

Luminance—Wikipedia, accessed on Apr. 21, 2020.*
International Search Report (ISR) dated Jun. 14, 2016 for International Application No. PCT/JP2016/059765.
Written Opinion (WO) dated Jun. 14, 2016 for International Application No. PCT/JP2016/059765.
J-PlatPat English abstract of JP 2015-196265 A.
J-PlatPat English abstract of JP 2015-188938A.
Extended European Search Report (EESR) dated Mar. 2, 2018 mailed in connection with corresponding European Application No. 16 82 6688.0.
Everton, S. K., et al., "Review of in-situ process monitoring and in-situ metrology for metal additive manufacturing", Materials and Design, vol. 95, Jan. 23, 2016, pp. 431-445, XP 029437399.

* cited by examiner

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is a an application under 35 U.S.C. 371 of International Application No. PCT/JP2016/059765 filed on Mar. 25, 2016, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of measuring the surface temperature of a recoated powder layer by an infrared camera.

CITATION LIST

Patent Literature

Patent literature 1: Japanese Patent Laid-Open No. 2010-509092

SUMMARY OF THE INVENTION

Technical Problem

In the technique described in the above literature, however, it is impossible to accurately measure the temperature of a molten pool.

The present invention enables to provide a technique of solving the above-described problem.

Solution to Problem

One aspect of the present invention provides a three-dimensional laminating and shaping apparatus comprising:
a material ejector that ejects a material of a three-dimensional laminated and shaped object;
a light beam irradiator that irradiates the ejected material with a light beam;
an image capturer that captures a molten pool formed by irradiating the ejected material with the light beam; and
a temperature deriving unit that derives a temperature of the molten pool based on a luminance of an image of the molten pool captured by the image capturer.

Another aspect of the present invention provides a three-dimensional laminated and shaped object shaping method comprising:
ejecting a material of a three-dimensional laminated and shaped object;
irradiating the ejected material with a light beam;
capturing a molten pool formed by irradiating the ejected material with the light beam; and
deriving a temperature of the molten pool based on a luminance of an image of the molten pool captured in the capturing.

Still other aspect of the present invention provides a three-dimensional laminated and shaped object shaping program for causing a computer to execute a method, comprising:
ejecting a material of a three-dimensional laminated and shaped object;
irradiating the ejected material with a light beam;
capturing a molten pool formed by irradiating the ejected material with the light beam; and
deriving a temperature of the molten pool based on a luminance of an image of the molten pool captured in the capturing.

Advantageous Effects of Invention

According to the present invention, it is possible to accurately measure the temperature of a molten pool based on an image captured by an infrared camera or the like.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 according to the first embodiment of the present invention will be described with reference to FIG. 1. The three-dimensional laminating and shaping apparatus 100 is an apparatus for shaping a three-dimensional laminated and shaped object by ejecting a material 130 onto a shaping table 120, and irradiating the ejected material 130 with a light beam 140.

Figure 1:
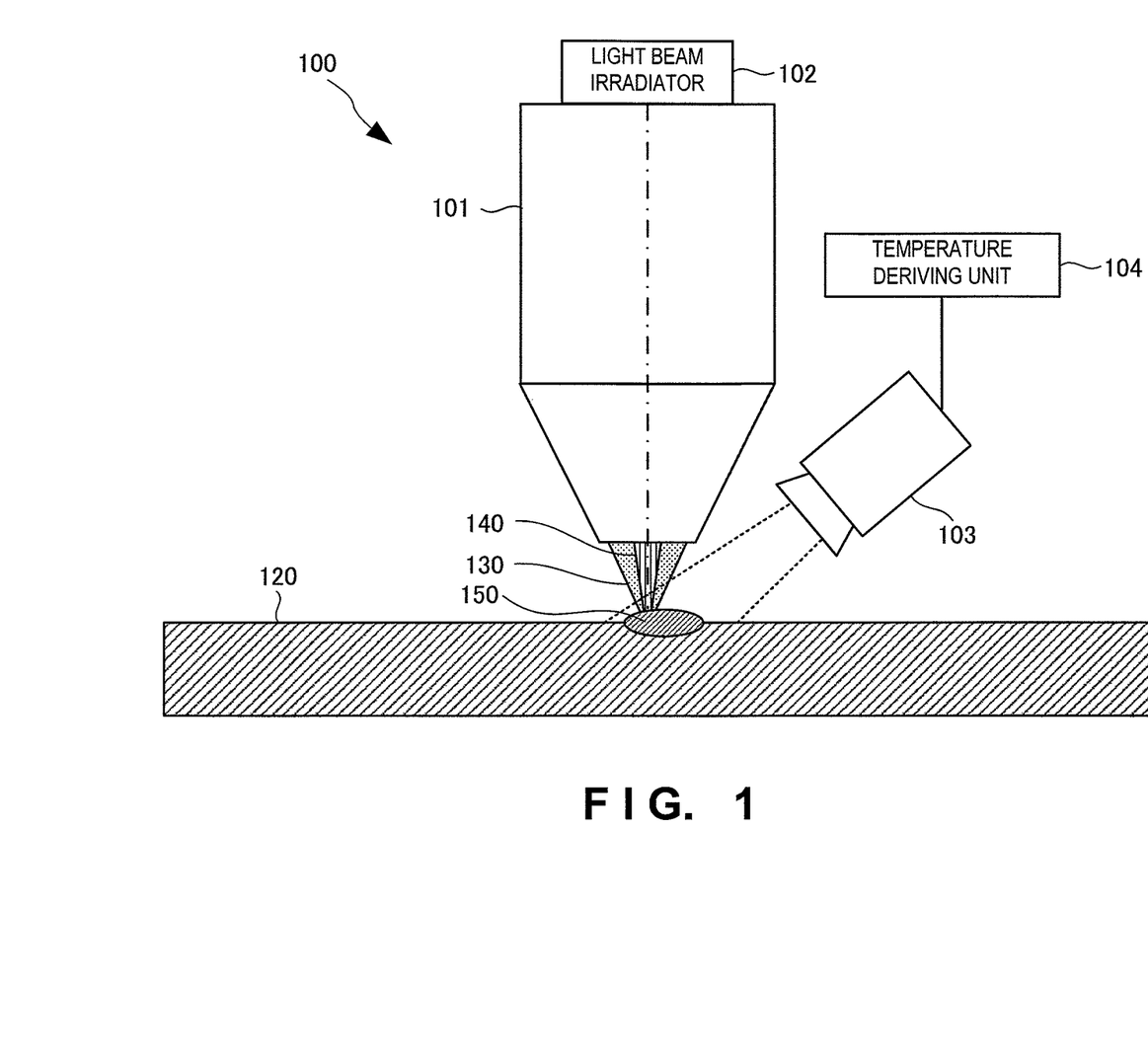
FIG. 1 is a view schematically showing the arrangement of a three-dimensional laminating and shaping apparatus according to the first embodiment of the present invention.

As shown in FIG. 1, the three-dimensional laminating and shaping apparatus 100 includes a material ejector 101, a light beam irradiator 102, an image capturer 103, and a temperature deriving unit 104. The material ejector 101 ejects the material 130 of the three-dimensional laminated and shaped object onto the shaping table 120 on which the three-dimensional laminated and shaped object is shaped. The light beam irradiator 102 irradiates the material 130 with the light beam 140. The image capturer 103 captures a molten pool 150 of the material 130, which is formed by irradiating the material 130 with the light beam 140. The temperature deriving unit 104 derives the temperature distribution of the molten pool 150 based on the luminance of the image captured by the image capturer 103.

According to this embodiment, it is possible to accurately measure the temperature of the molten pool based on the image captured by the image capturer.

Second Embodiment

Figure 2:
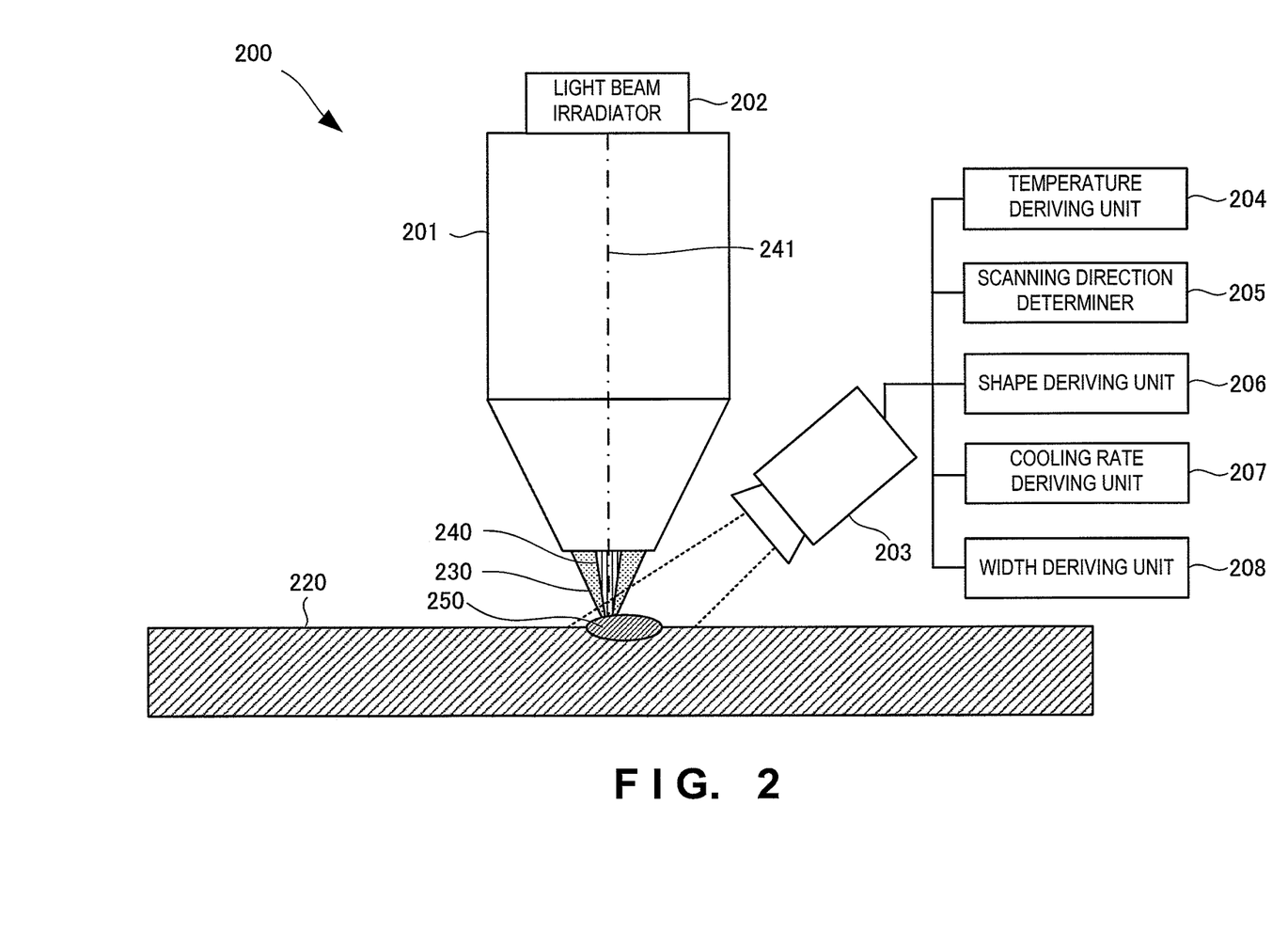
FIG. 2 is a view schematically showing the arrangement of a three-dimensional laminating and shaping apparatus according to the second embodiment of the present invention.

A three-dimensional laminating and shaping apparatus 200 according to the second embodiment of the present invention will be described with reference to FIGS. 2 to 5. FIG. 2 is a view for schematically explaining the arrangement of the three-dimensional laminating and shaping apparatus 200 according to this embodiment.

The three-dimensional laminating and shaping apparatus 200 includes an ejection nozzle 201, a light beam irradiator 202, a camera 203, a temperature deriving unit 204, a scanning direction determiner 205, a shape deriving unit 206, a cooling rate deriving unit 207, and a width deriving unit 208.

The ejection nozzle 201 ejects a metal powder as a material 230 of a three-dimensional laminated and shaped object onto a shaping table 220. The material 230 is irradiated, from the distal end portion of the ejection nozzle 201, with a light beam 240 such as a laser beam emitted from the light beam irradiator 202. The material 230 irradiated with the light beam 240 such as a laser beam or electron beam is melted by heat applied from the light beam 240, thereby forming a molten pool 250.

An image (video) of the molten pool 250 is captured by the camera 203 for capturing visible light, which is obliquely arranged on the side of the ejection nozzle 201. Note that the camera 203 may be arranged on the same axial as an optical axis 241 of the light beam 240. The camera 203 is used as an example of an image capturing apparatus in this example. The present invention, however, is not limited to this and, for example, a sensor capable of capturing infrared light or a light beam of another wavelength may be used.

In the three-dimensional laminating and shaping apparatus 200 according to this embodiment, the shaping table 220 moves on the X-Y plane (in the X and Y directions). Note that the three-dimensional laminating and shaping apparatus 200 according to this embodiment is configured so that the ejection nozzle 201 is fixed and the shaping table 220 moves. To the contrary, the shaping table 220 may be fixed and the ejection nozzle 201 may move.

The temperature deriving unit 204 measures the temperature of the molten pool 250 based on the luminance of the image captured by the camera 203. The scanning direction determiner 205 derives the scanning direction of the light beam 240, that is, a direction in which the material 230 on the X-Y plane is laminated. The scanning direction determiner 205 derives the scanning direction (moving direction) of the shaping table 220 based on the position of the shaping table 220, for example, the machine coordinate position of an NC (Numerical Control) apparatus or the like. In this case, for example, the scanning direction determiner 205 derives the moving direction of the shaping table 220 based on the current position and past position of the shaping table 220, thereby deriving the scanning direction of the light beam 240.

The shape deriving unit 206 derives the shape of the molten pool 250 based on the luminance of the image captured by the camera 203 and the scanning direction of the light beam 240 derived by the scanning direction determiner 205. Furthermore, the cooling rate deriving unit 207 derives the cooling rate of the molten pool 250 based on the luminance of the image captured by the camera 203 and the scanning direction of the light beam 240. The cooling rate deriving unit 207 derives the cooling rate of the molten pool 250 based on the scanning distance of the light beam 240 (shaping table 220), that is, the moving distance of the light beam 240 (shaping table 220), the scanning direction (moving direction), and the luminance of the image. For example, the cooling rate deriving unit 207 derives the cooling rate of the molten pool 250 from the moving distance of the light beam 240 and a luminance change of the image. That is, since a change in the luminance of the image with time corresponds to a change in the temperature of the molten pool 250 with time, the cooling rate deriving unit 207 derives the cooling rate of the molten pool 250 from a change in the temperature with time.

The width deriving unit 208 derives the width of the molten pool in a direction perpendicular to the scanning direction (laminating direction) of the light beam 240 based on the luminance of the image captured by the camera 203 and the scanning direction of the light beam 240. For example, the width deriving unit 208 decides the width of the molten pool 250 in the direction perpendicular to the laminating direction based on the luminance of the image, that is, the size of a bright portion in the image or the like.

Figure 3A:
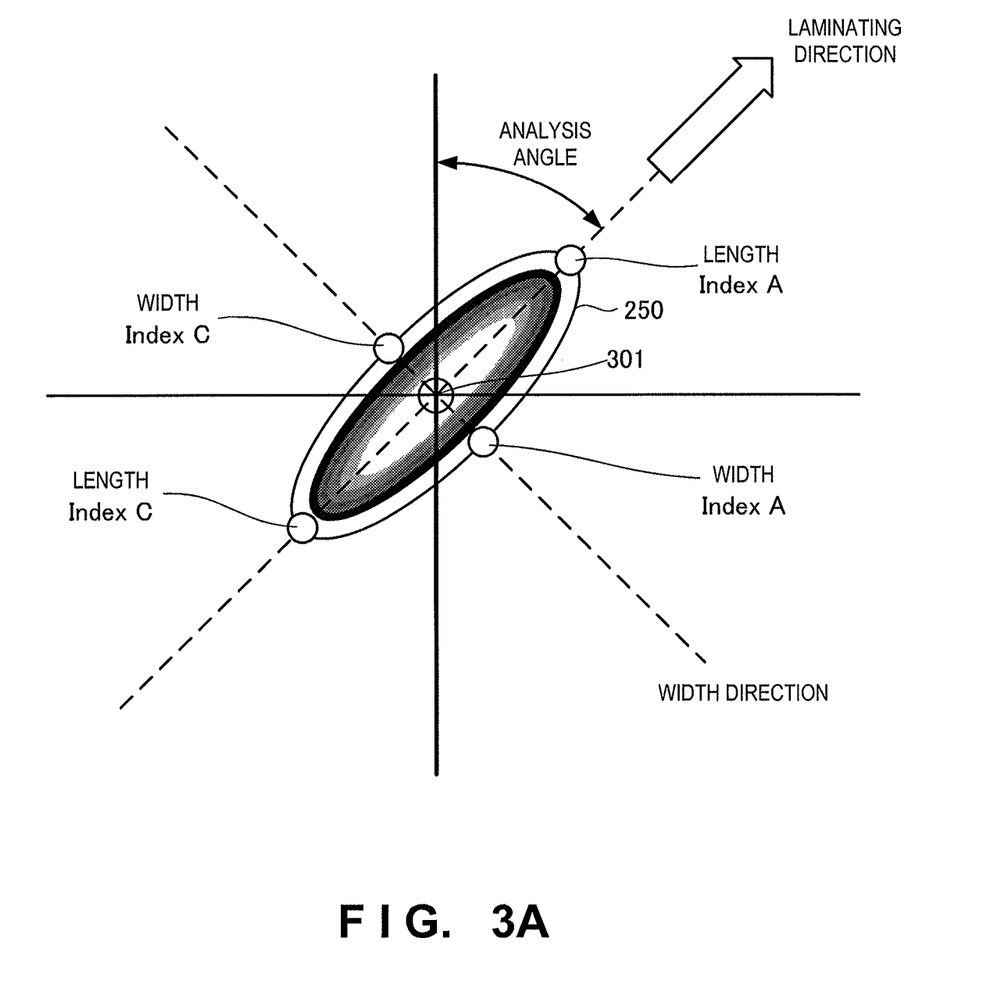
FIG. 3A is a view showing an example of an image obtained by capturing a molten pool formed by the three-dimensional laminating and shaping apparatus according to the second embodiment of the present invention.
Figure 3B:
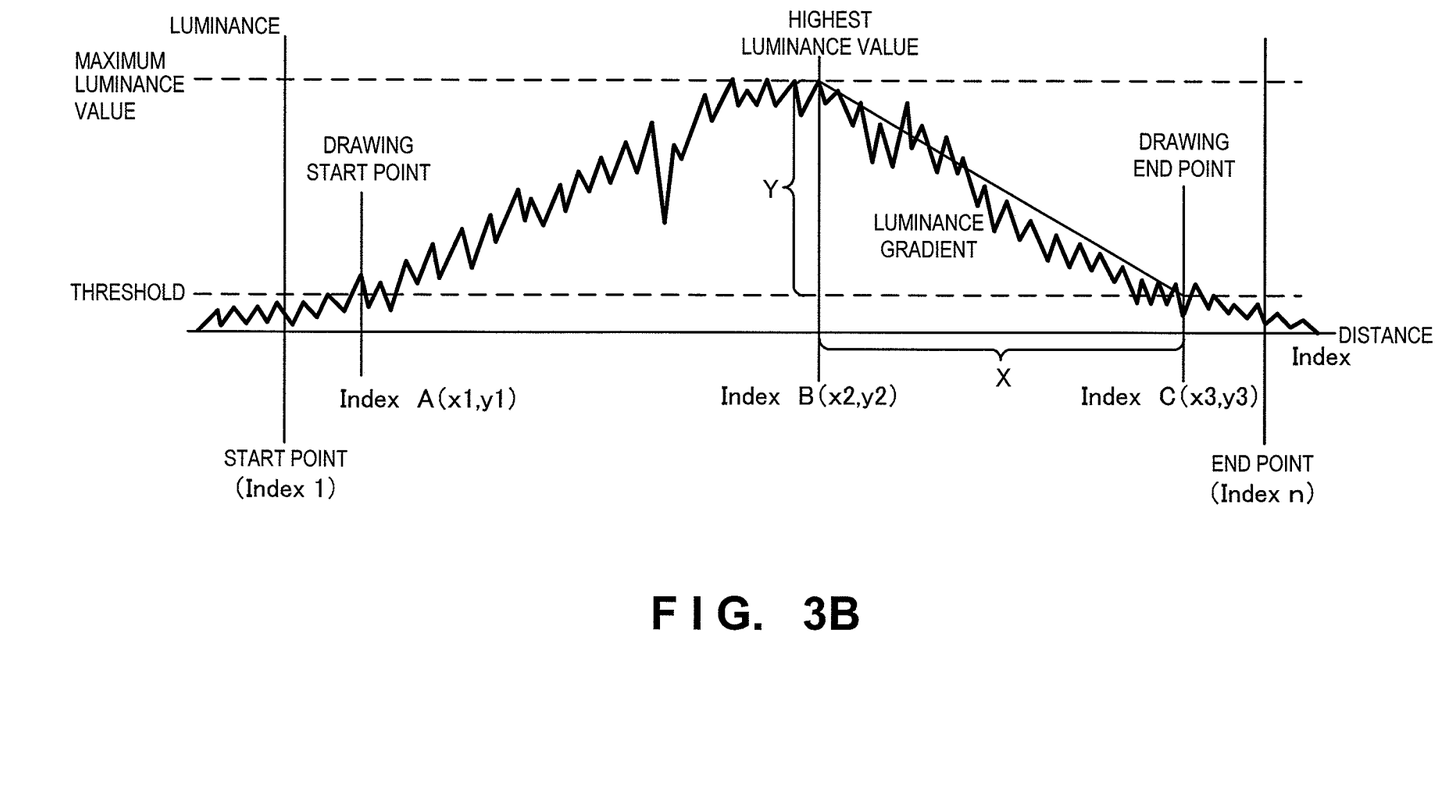
FIG. 3B is a graph showing an example of the graph of the luminance distribution data of the image obtained by capturing the molten pool formed by the three-dimensional laminating and shaping apparatus according to the second embodiment of the present invention.
Figure 3C:
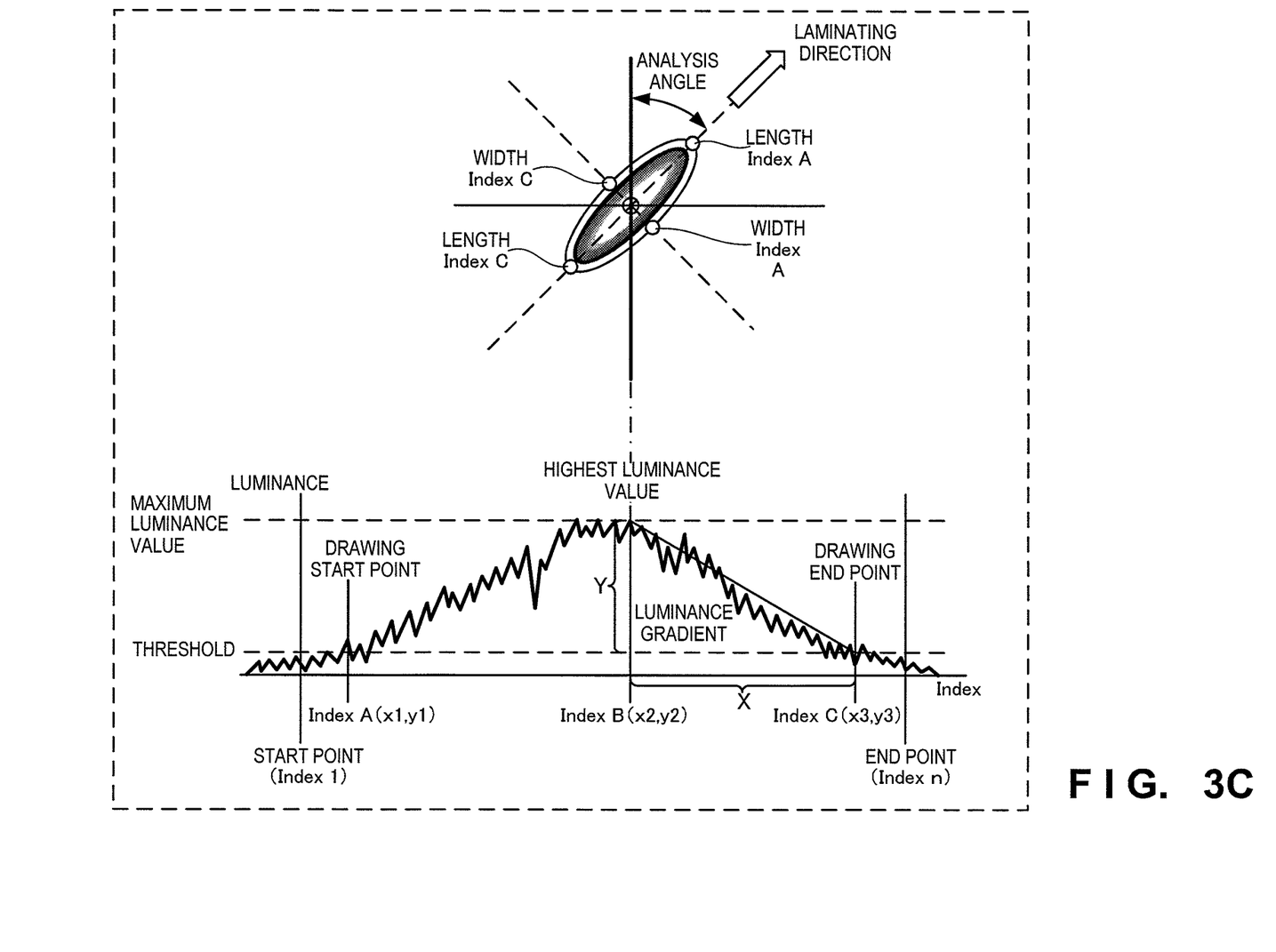
FIG. 3C is a view showing the relationship between the luminance distribution data and the image of the molten pool formed by the three-dimensional laminating and shaping apparatus according to the second embodiment of the present invention.

FIG. 3A is a view showing an example of the image obtained by capturing the molten pool 250 formed by the three-dimensional laminating and shaping apparatus 200 according to this embodiment. FIG. 3B is a graph showing an example of the graph of the luminance distribution data of the image obtained by capturing the molten pool 250 formed by the three-dimensional laminating and shaping apparatus 200 according to this embodiment. FIG. 3C is a view showing the relationship between the luminance distribution data and the image of the molten pool 250 formed by the three-dimensional laminating and shaping apparatus 200 according to this embodiment.

As shown in FIG. 3A, the shape of the molten pool 250 is an elliptic shape which is long in the scanning direction (laminating direction) of the light beam 240. That is, the shape of the molten pool 250 is an elliptic shape which is long in the scanning direction (laminating direction) of the light beam 240 and is short in the direction perpendicular to the scanning direction. A center 301 of the molten pool 250 is irradiated with the light beam 240. Note that an analysis angle shown in FIG. 3A indicates an angle between the laminating direction and a direction in which the camera 203 captures an image.

FIG. 3B shows an example of the graph of the luminance distribution data, in which the abscissa indicates the distance and the ordinate indicates the luminance. Note that the graph of the luminance distribution data is obtained by analyzing the image captured by the camera 203 in two directions of the laminating direction (the scanning direction of the light beam 240) and the direction perpendicular to the laminating direction (a direction of 90° with respect to the scanning direction (traveling direction)). FIG. 3C shows the relationship between the image of the molten pool 250 shown in FIG. 3A and the luminance distribution data graph shown in FIG. 3B. It is understood that the luminance at the focus position of the light beam 240 is highest and the luminance decreases in a direction away from the focus position.

Figure 4A:
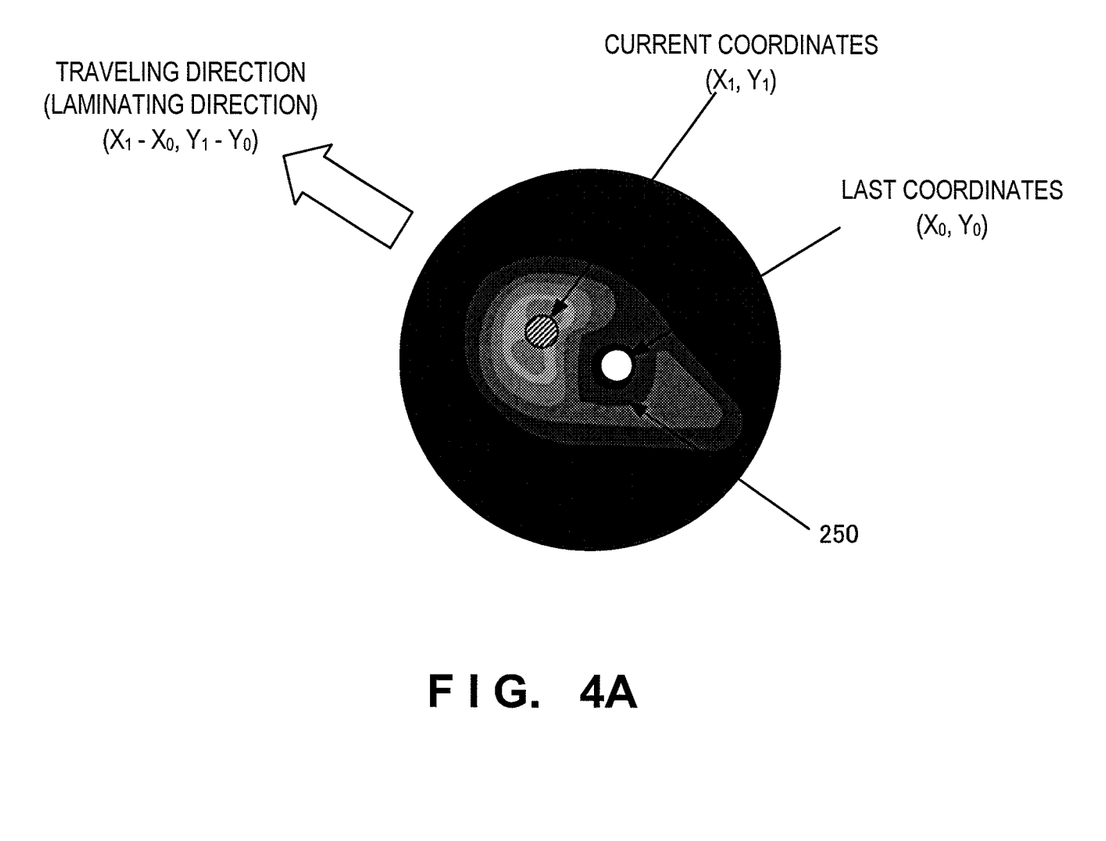
FIG. 4A is a view for explaining a method of deriving a scanning direction from the image of the molten pool formed by the three-dimensional laminating and shaping apparatus according to the second embodiment of the present invention.

FIG. 4A is a view for explaining a method of deriving the scanning direction from the image of the molten pool 250 formed by the three-dimensional laminating and shaping apparatus 200 according to this embodiment. To derive the cooling rate (temperature gradient) of the molten pool 250 (melt pool), it is necessary to grasp the focus position (laser focus position) of the light beam 240 and the luminance (temperature) at the position of the trailing edge of the molten pool 250. During shaping of the three-dimensional laminated and shaped object, the scanning direction (traveling direction) of the light beam 240 always changes in accordance with the shape to be laminated, and it is thus difficult to determine the scanning direction (traveling direction) based on only the image obtained by capturing the molten pool 250. To cope with this, the scanning direction determiner 205 derives the scanning direction (traveling direction) based on the position of the shaping table 220, that is, the machine coordinate position of the NC apparatus.

In the three-dimensional laminating and shaping apparatus 200, the ejection nozzle 201 is fixed, and the shaping table 220 moves to shape the three-dimensional laminated and shaped object. Since the three-dimensional laminating and shaping apparatus 200 always grasps data of the machine coordinate position of the shaping table 220, the scanning direction determiner 205 derives the traveling direction based on a change in the data of the machine coordinate position.

Figure 4B:
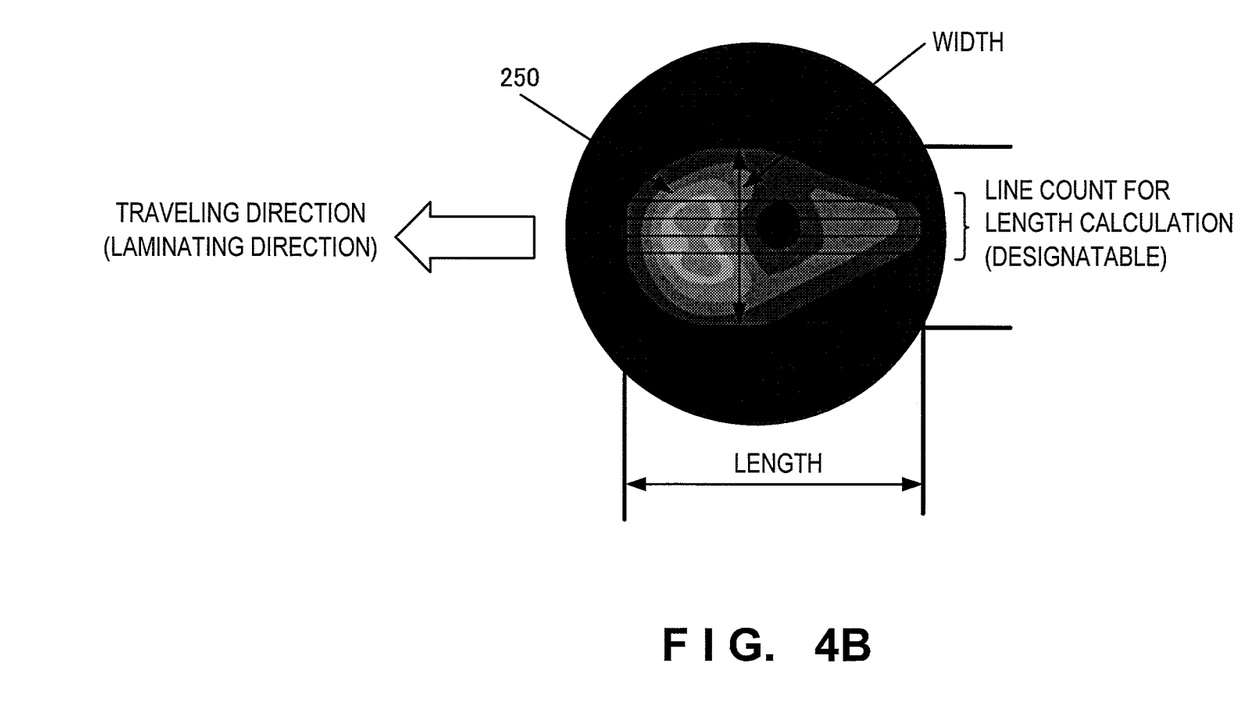
FIG. 4B is a view for explaining a method of deriving the width and length of the molten pool from the image of the molten pool formed by the three-dimensional laminating and shaping apparatus according to the second embodiment of the present invention.

FIG. 4B is a view for explaining a method of deriving the width and length of the molten pool from the image of the molten pool 250 formed by the three-dimensional laminating and shaping apparatus 200 according to this embodiment. For example, the width deriving unit 208 determines, as the molten pool 250 (melt pool), an area having a luminance value exceeding a given luminance value (threshold), and derives (calculates) a melt pool length as the length of the molten pool 250 in the scanning direction (traveling direction) of the light beam 240. Similarly, the width deriving unit 208 derives (calculates) the length, in a direction (vertical direction) perpendicular to the scanning direction of the light beam 240, of the area having the luminance value exceeding the given luminance value, that is, the width of the molten pool 250. To decrease variations in the derived value (calculated value) of the width deriving unit 208, for example, the line count for length calculation as a preset boundary of the threshold of the luminance can be designated.

Figure 4C:
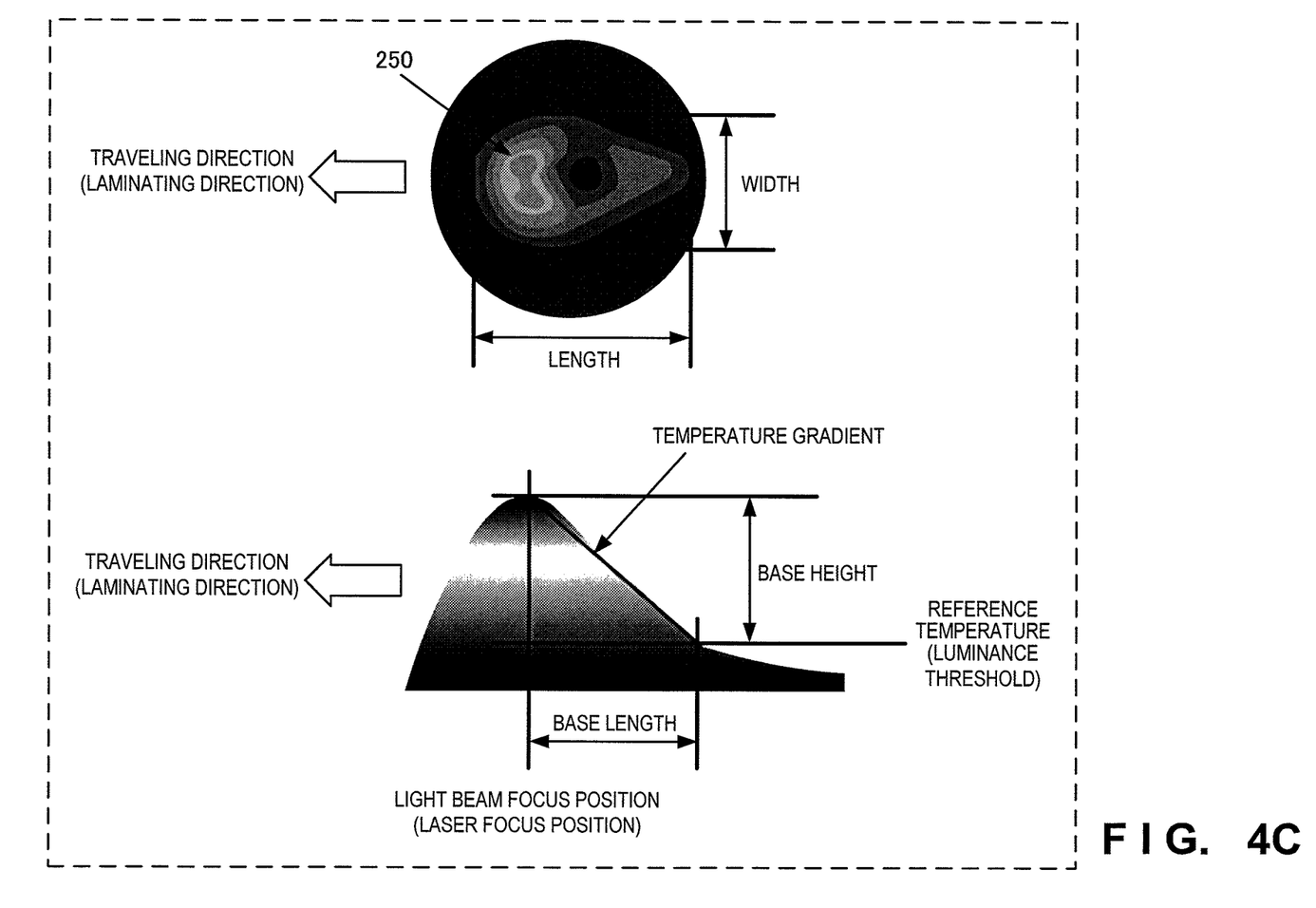
FIG. 4C is a view for explaining a method of deriving the cooling rate of the molten pool from the image of the molten pool formed by the three-dimensional laminating and shaping apparatus according to the second embodiment of the present invention.

FIG. 4C is a view for explaining a method of deriving the cooling rate of the molten pool from the image of the molten pool 250 formed by the three-dimensional laminating and shaping apparatus 200 according to this embodiment. The cooling rate deriving unit 207 derives a base length as the distance from the irradiation position (focus position) of the light beam 240 to the trailing edge of the molten pool 250 so as to confirm the temperature gradient in the molten pool 250 for the purpose of monitoring a change in the temperature of the molten pool 250 after laminating of the material 230. For the same reason, the cooling rate deriving unit 207 derives a base height (the luminance value at the irradiation position of the light beam 240—the luminance threshold of the molten pool 250).

Figure 5:
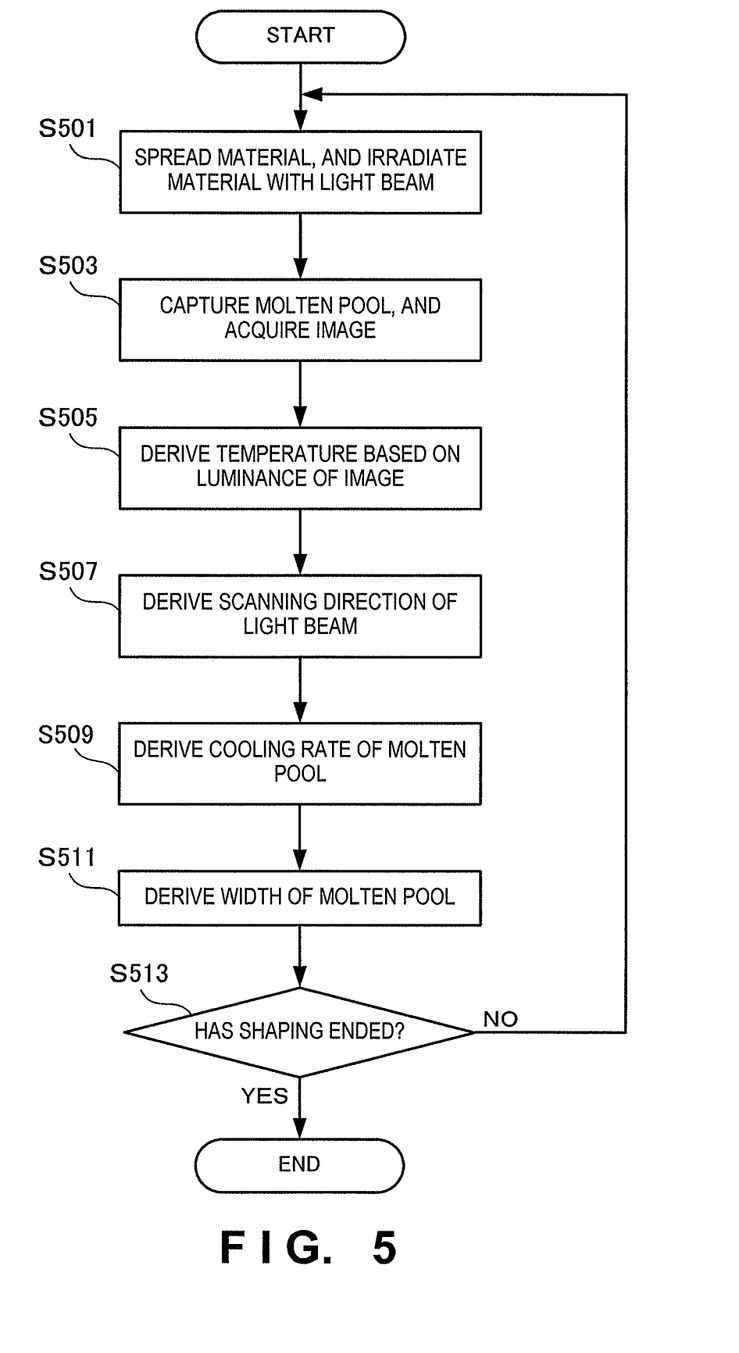
FIG. 5 is a flowchart for explaining the processing procedure of the three-dimensional laminating and shaping apparatus according to the second embodiment of the present invention.

FIG. 5 is a flowchart for explaining the processing procedure of the three-dimensional laminating and shaping apparatus 200 according to this embodiment. In step S501, the three-dimensional laminating and shaping apparatus 200 ejects the material 230 onto the shaping table 220, and irradiates the material 230 with the light beam 240 from the light beam irradiator 202. The three-dimensional laminating and shaping apparatus 200 acquires, for example, the shaping model of a three-dimensional laminated and shaped object, creates an ejection plan of the material 230 and an irradiation plan of the light beam 240 based on the acquired shaping model, and executes shaping of the three-dimensional laminated and shaped object in accordance with the created ejection plan and irradiation plan.

In step S503, the three-dimensional laminating and shaping apparatus 200 captures the molten pool 250 by the camera 203, and acquires an image of the molten pool 250. In step S505, the three-dimensional laminating and shaping apparatus 200 derives the temperature of the molten pool 250 based on the luminance of the acquired image of the molten pool 250. In step S507, the three-dimensional laminating and shaping apparatus 200 derives the scanning direction (laminating direction or traveling direction) of the light beam 240 based on the position (machine coordinate position) of the shaping table 220. In step S509, the three-dimensional laminating and shaping apparatus 200 derives the cooling rate of the molten pool 250 based on the luminance of the image of the molten pool 250 and the scanning direction of the light beam 240.

In step S511, the three-dimensional laminating and shaping apparatus 200 derives the width of the molten pool 250 in the direction perpendicular to the scanning direction of the light beam 240 based on the luminance of the image of the molten pool 250 and the scanning direction of the light beam 240. In step S511, the three-dimensional laminating and shaping apparatus 200 may derive the length of the molten pool 250 in a direction parallel to the scanning direction of the light beam 240 based on the luminance of the image of the molten pool 250 and the scanning direction of the light beam 240. Note that the sequence of steps S505 to S511 described above is not limited to this, and various sequences can be adopted.

In step S513, the three-dimensional laminating and shaping apparatus 200 determines whether shaping of the three-dimensional laminated and shaped object has ended. If shaping of the three-dimensional laminated and shaped object has not ended (NO in step S513), the three-dimensional laminating and shaping apparatus 200 returns to step S501 to repeat the subsequent steps; otherwise (YES in step S513), the three-dimensional laminating and shaping apparatus 200 terminates the processing.

According to this embodiment, it is possible to accurately measure the temperature of the molten pool based on the image captured by the image capturer. It is possible to measure, based on the image captured by the image capturer, the length of the molten pool in the direction parallel to the scanning direction of the light beam and the width of the molten pool in the direction perpendicular to the scanning direction of the light beam. It is possible to derive the cooling speed of the molten pool based on the luminance of the image captured by the image capturer and the scanning direction of the light beam. In addition, it becomes unnecessary to calibrate a measuring device since a luminance change in the molten pool is approximated and used as a temperature gradient regardless of the absolute temperature of the molten pool. Furthermore, since the threshold of the luminance change is set and two-dimensional coordinate data representing the boundary of the threshold is simplified and used as the dimensions of the molten pool, it is possible to perform measurement and control with high response.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
   a material ejector that ejects a material for a three-dimensional laminated and shaped object;
   a light beam irradiator that irradiates the ejected material with a light beam;
   an image capturer that captures a molten pool formed by irradiating the ejected material with the light beam;
   a processor that is configured to:
   (a) derive a changing scanning direction of the light beam in progress of laminating and shaping the object,
   (b) derive a temperature distribution of the molten pool based on a luminance of an image of the molten pool captured by said image capturer,
   (c) derive a shape of the molten pool based on the luminance and the changing scanning direction,
   (d) derive a cooling rate of the molten pool based on the luminance, a scanning distance of the light beam, and the changing scanning direction, and
   (e) derive a width of the molten pool in a direction perpendicular to the changing scanning direction based on the luminance and the changing scanning direction, using a preset boundary of a threshold of the luminance.

2. The three-dimensional laminating and shaping apparatus according to claim 1, wherein the luminance comprises a luminance of emitted light from the molten pool.

3. A three-dimensional laminated and shaped object shaping method comprising:
   ejecting a material of a three-dimensional laminated and shaped object;
   irradiating the ejected material with a light beam;
   capturing a molten pool formed by irradiating the ejected material with the light beam;
   deriving a temperature of the molten pool based on a luminance of an image of the molten pool captured in the capturing;
   deriving a changing scanning direction of the light beam in progress of laminating and shaping the object;
   deriving a shape of the molten pool based on the luminance and the changing scanning direction;
   deriving a cooling rate of the molten pool based on the luminance, a scanning distance of the light beam, and the changing scanning direction; and
   deriving a width of the molten pool in a direction perpendicular to the changing scanning direction based on the luminance and the changing scanning direction, using a preset boundary of a threshold of the luminance.

4. A non-transitory computer readable medium storing a three-dimensional laminated and shaped object shaping program for causing a computer to execute a method comprising:
   ejecting a material of a three-dimensional laminated and shaped object;
   irradiating the ejected material with a light beam;
   capturing a molten pool formed by irradiating the ejected material with the light beam;
   deriving a temperature of the molten pool based on a luminance of an image of the molten pool captured in the capturing;
   deriving a changing scanning direction of the light beam in progress of laminating and shaping the object;
   deriving a shape of the molten pool based on the luminance and the changing scanning direction;
   deriving a cooling rate of the molten pool based on the luminance, a scanning distance of the light beam, and the changing scanning direction; and
   deriving a width of the molten pool in a direction perpendicular to the changing scanning direction based on the luminance and the changing scanning direction, using a preset boundary of a threshold of the luminance.

5. The three-dimensional laminating and shaping method according to claim 3, wherein the luminance comprises a luminance of emitted light from the molten pool.

6. The non-transitory computer-readable medium according to claim 4, wherein the luminance comprises a luminance of emitted light from the molten pool.

7. The three-dimensional laminating and shaping apparatus according to claim 1, wherein the processor is configured to derive the changing scanning direction of the light beam from a moving direction of a shaping table based on a current position and past position of the shaping table.

8. The three-dimensional laminating and shaping apparatus according to claim 1, wherein the processor is configured to derive the shape of the molten pool as an elliptic shape, which is long in the changing scanning direction and is short in a direction perpendicular to the changing scanning direction.

* * * * *